US009685797B2

United States Patent
Tofigh et al.

(10) Patent No.: US 9,685,797 B2
(45) Date of Patent: Jun. 20, 2017

(54) SYSTEMS AND METHODS FOR BALANCING MULTI-CELL BATTERIES WITH A TRANSFORMER AND A RECTIFIER CIRCUIT

(75) Inventors: Farshid Tofigh, Mission Viejo, CA (US); Anhtai Le Tran, Santa Ana, CA (US)

(73) Assignee: LEACH INTERNATIONAL CORPORATION, Buena Park, CA (US)

( * ) Notice: Subject to any disclaimer, the term of this patent is extended or adjusted under 35 U.S.C. 154(b) by 188 days.

(21) Appl. No.: 12/963,583

(22) Filed: Dec. 8, 2010

(65) Prior Publication Data

US 2011/0140663 A1    Jun. 16, 2011

Related U.S. Application Data

(60) Provisional application No. 61/286,307, filed on Dec. 14, 2009.

(51) Int. Cl.
H02J 7/00 (2006.01)

(52) U.S. Cl.
CPC .......... *H02J 7/0018* (2013.01); *H02J 7/0014* (2013.01); *H02J 7/0019* (2013.01)

(58) Field of Classification Search
CPC ...... H02J 7/0016; H02J 7/0018; H02J 7/0019; H02J 7/0014
USPC .......................................... 320/116, 118, 119
See application file for complete search history.

(56) References Cited

U.S. PATENT DOCUMENTS

| 3,054,041 | A | | 9/1962 | Moore |
| 4,331,911 | A | * | 5/1982 | Park .............................. 320/119 |
| 5,594,320 | A | | 1/1997 | Pacholok et al. |
| 5,659,237 | A | | 8/1997 | Divan et al. |

(Continued)

FOREIGN PATENT DOCUMENTS

| CN | 101409455 A | 4/2009 |
| EP | 0432639 B1 | 5/1995 |

(Continued)

OTHER PUBLICATIONS

International Search Report for Application No. PCT/US2010/059581 filed Dec. 8, 2010, dated Jan. 28, 2011, mailed Feb. 16, 2011, 2 pages.

(Continued)

*Primary Examiner* — Richard Isla Rodas
*Assistant Examiner* — Manuel Hernandez
(74) *Attorney, Agent, or Firm* — Lewis Roca Rothgerber Christie LLP

(57) ABSTRACT

Systems and methods for balancing multi-cell batteries are provided. In one embodiment, the battery balancing circuit includes a battery including a plurality of cells coupled in series, a first terminal and a second terminal, a transformer including a primary winding and a plurality of secondary windings, where each secondary winding is coupled to one of the plurality of cells via a secondary switch and a rectifier circuit, where the primary winding is coupled between the first terminal and the second terminal of the battery, a primary switch in series with the primary winding of the transformer, and a control circuitry coupled to the primary switch, the plurality of secondary switches, and each of the plurality of cells.

11 Claims, 3 Drawing Sheets

(56) References Cited

U.S. PATENT DOCUMENTS

| | | | |
|---|---|---|---|
| 5,767,660 | A | 6/1998 | Schmidt |
| 5,821,729 | A | 10/1998 | Schmidt et al. |
| 5,982,143 | A * | 11/1999 | Stuart ................. H01M 10/441 320/119 |
| 6,150,795 | A | 11/2000 | Kutkut et al. |
| 6,369,546 | B1 | 4/2002 | Canter |
| 6,670,789 | B2 * | 12/2003 | Anzawa et al. .............. 320/118 |
| 6,844,703 | B2 | 1/2005 | Canter |
| 6,873,134 | B2 | 3/2005 | Canter et al. |
| 7,592,775 | B2 | 9/2009 | Altemose et al. |
| 2002/0109482 | A1 | 8/2002 | Anzawa et al. |
| 2004/0032236 | A1 | 2/2004 | Canter |
| 2004/0135545 | A1 * | 7/2004 | Fowler et al. ................ 320/118 |
| 2004/0257042 | A1 | 12/2004 | Liu et al. |
| 2005/0017682 | A1 | 1/2005 | Canter et al. |
| 2006/0001910 | A1 | 1/2006 | Ikeda et al. |
| 2008/0185994 | A1 | 8/2008 | Altemose |
| 2008/0211456 | A1 * | 9/2008 | Bolz et al. .................... 320/116 |
| 2009/0021217 | A1 | 1/2009 | Nakazawa et al. |
| 2009/0140693 | A1 | 6/2009 | Johnson, Jr. |
| 2010/0123433 | A1 | 5/2010 | Guo |
| 2011/0234164 | A1 * | 9/2011 | Furukawa ............. H02J 7/0018 320/118 |
| 2014/0354212 | A1 * | 12/2014 | Sugeno ............... H01M 10/441 320/103 |

FOREIGN PATENT DOCUMENTS

| | | |
|---|---|---|
| EP | 1 198 050 A1 | 4/2002 |
| JP | 10-257682 A | 9/1998 |
| JP | 2001-268815 A | 9/2001 |
| JP | 2002-125325 A | 4/2002 |
| JP | 2002-223528 A | 8/2002 |
| JP | 2003-513605 A | 4/2003 |
| JP | 2004-80992 A | 3/2004 |
| JP | 2005-268128 A | 9/2005 |
| JP | 2005-39993 A | 2/2006 |
| JP | 2006-507790 A | 3/2006 |
| JP | 2009-540793 A | 11/2009 |
| JP | 2013223320 A * | 10/2013 |
| WO | WO 2007/145460 A1 | 12/2007 |
| WO | WO 2011/070517 A1 | 6/2011 |

OTHER PUBLICATIONS

Written Opinion for Application No. PCT/US2010/059581 filed Dec. 8, 2010, dated Jan. 28, 2011, mailed Feb. 16, 2011, 6 pages.

Extended European Search Report for Application No. 10838134.4; mailed Aug. 18, 2016, 7 pages.

* cited by examiner

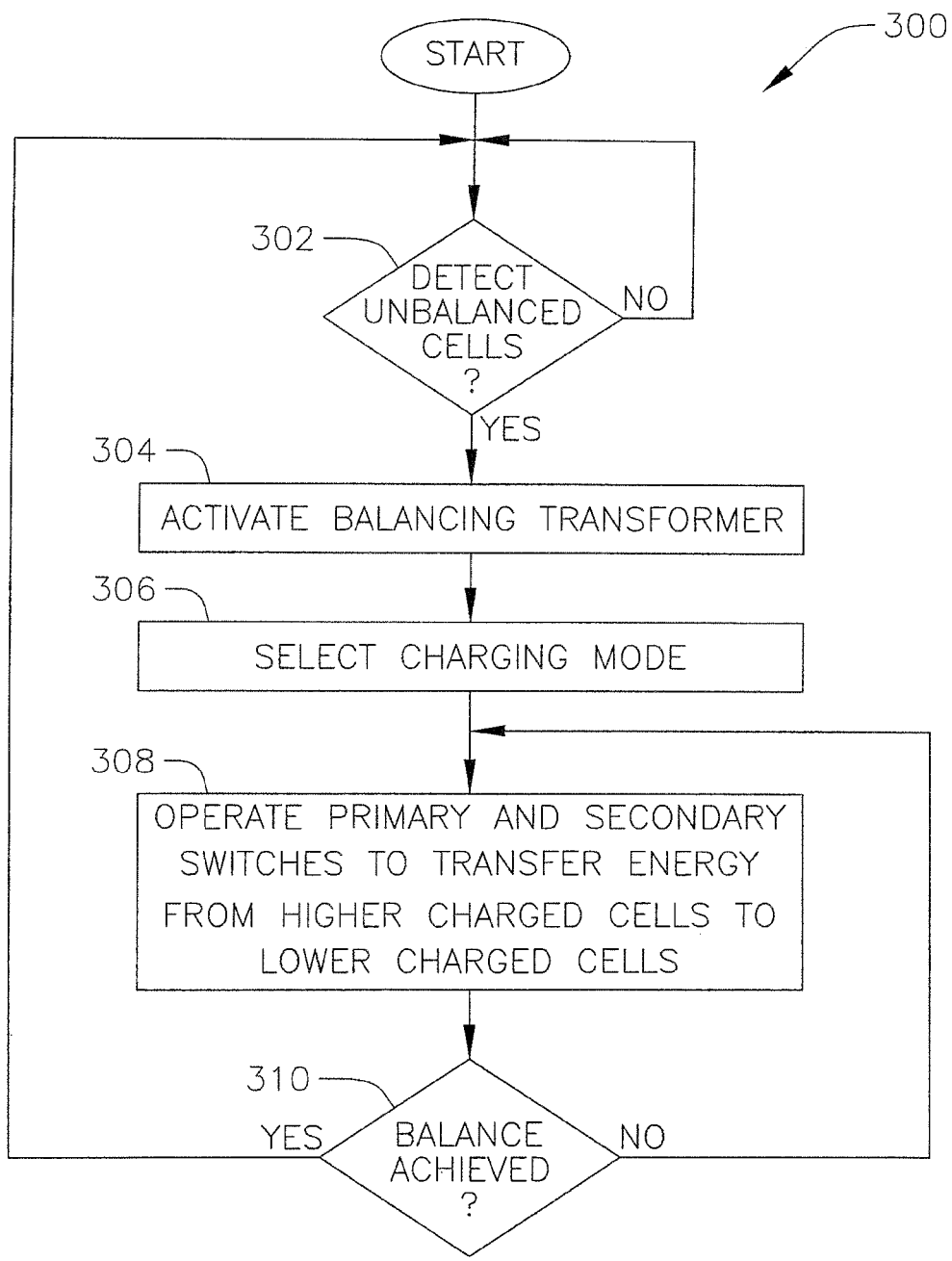

SYSTEMS AND METHODS FOR BALANCING MULTI-CELL BATTERIES WITH A TRANSFORMER AND A RECTIFIER CIRCUIT

CROSS-REFERENCE TO RELATED APPLICATION(S)

The present application claims the benefit of Provisional Application No. 61/286,307, filed Dec. 14, 2009, entitled "BATTERY BALANCING CIRCUIT", the entire content of which is incorporated herein by reference.

FIELD

The present invention relates to battery balancing systems. More specifically, the invention relates to systems and methods for balancing cells of a multi-cell battery.

BACKGROUND

For Lithium-ion (Li-ion) batteries, an imbalance condition between the cells or an over-voltage condition can cause a dangerous failure. Both of these problems, along with the corresponding over-temperature condition, can result in a fire that is not easily extinguished. Battery control circuitry is generally used to monitor the individual cell voltages and maintain any imbalances between cell voltages within a predefined range. The conventional method to balance the cells is to discharge a cell with high voltage (e.g., over-voltage) and dissipate its excess energy (voltage) in form of heat. However, this method results in wasted battery energy. In addition, the dissipated heat is not conducive to Li-ion battery technology as it can create an over-temperature problem for the battery pack that is often unsafe. A safer and more efficient battery balancing circuit is therefore desirable.

SUMMARY OF THE INVENTION

Aspects of the invention relate to systems and methods for balancing multi-cell batteries. In one embodiment, the invention relates to a battery balancing circuit including a battery including a plurality of cells coupled in series, a first terminal and a second terminal, a transformer including a primary winding and a plurality of secondary windings, where each secondary winding is coupled to one of the plurality of cells via a secondary switch and a rectifier circuit, where the primary winding is coupled between the first terminal and the second terminal of the battery, a primary switch in series with the primary winding of the transformer, and a control circuitry coupled to the primary switch, the plurality of secondary switches, and each of the plurality of cells.

In another embodiment, the invention relates to a battery balancing circuit including a battery including a plurality of cells coupled in series, a first terminal and a second terminal, a transformer including a primary winding and a plurality of secondary windings, where each secondary winding is coupled to one of the plurality of cells via a secondary switch and a rectifier circuit, where a center-tap terminal of the primary winding is coupled to the first terminal of the battery, a first primary switch coupled in series between a first terminal of the primary winding and the second terminal of the battery, a second primary switch coupled in series between a second terminal of the primary winding and the second terminal of the battery, and a control circuitry coupled to the first primary switch, the second primary switch, the plurality of secondary switches, and each of the plurality of cells.

In yet another embodiment, the invention relates to a method for balancing energy stored in a plurality of cells of a battery having a first terminal and a second terminal, the method including detecting an imbalance condition in one of the plurality of cells of the battery, actuating, repeatedly, a primary switch coupled between the first terminal of the battery and a transformer including a primary winding and a plurality of secondary windings, where each secondary winding is coupled to one of the plurality of cells via a secondary switch and a rectifier circuit, where the primary winding is coupled between the first terminal and the second terminal of the battery, and actuating the secondary switch corresponding to the one of the plurality of battery cells having the imbalance condition.

BRIEF DESCRIPTION OF THE DRAWINGS

FIG. 3 is a flowchart of a process for controlling a battery balancing circuit in accordance with one embodiment of the invention.

DETAILED DESCRIPTION OF THE INVENTION

Figure 1:
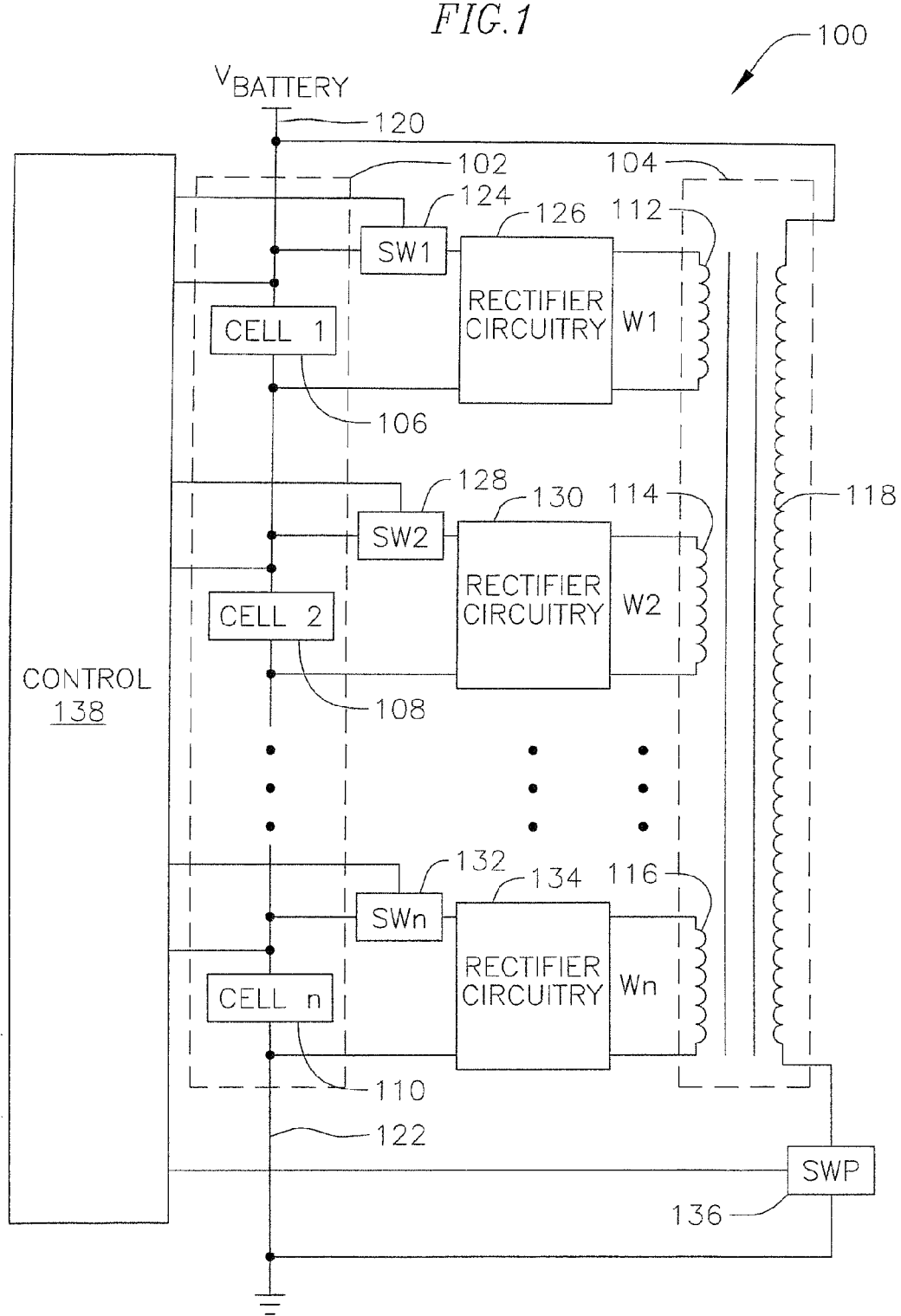
FIG. 1 is a schematic block diagram of a battery balancing circuit in accordance with one embodiment of the invention.

Referring now to the drawings, embodiments of battery balancing circuits include a transformer and multiple switches coupled to control circuitry for identifying unbalanced cells (e.g., low voltage cells) of a multi-cell battery and transferring energy from the battery as a whole to the identified cells. In such case, the balancing circuits can transfer energy from highly charged cells, or overcharged cells, to lower charged cells. In most embodiments, charging energy for balancing the cells is provided by the battery itself. In such case, no external charging energy or power source is used. In this way, the battery balancing circuits can act to simply rebalance the battery.

In several embodiments, the transformer is controlled by a control signal having a switching frequency and a duty cycle applied to a primary winding of the transformer. In several embodiments, the transformer is operated in an efficient mode to maximize energy transfer from the battery to specific cells. In some embodiments, the transformer can be controlled to operate in an inefficient mode intended to dissipate some of the energy rather than simply redirecting the energy to cells having lower voltage charge. In either case, unbalanced conditions of the battery as a whole (e.g., over-voltage), or particular cells, that can be dangerous, can be reduced and/or eliminated.

Unlike conventional passive balancing control schemes, which dissipate the excess voltage of unbalanced cell(s) in form of heat, embodiments of battery balancing circuits described herein can shift the power from higher cells to the cells with the lower voltage. This substantially increases the life of the battery, as it does not waste the stored energy. In several embodiments, the battery balancing circuits also expedite the balancing by reducing the voltage of the cells with the higher voltage at the same time the voltage of the cells with the lower voltage is increased.

FIG. 1 is a schematic block diagram of a battery balancing circuit 100 in accordance with one embodiment of the invention. The battery balancing circuit 100 includes a battery 102 coupled to a transformer 104. The transformer 104 can be used to redistribute energy from highly charged cells, or overcharged cells, to lower charged cells. The battery 102 includes a number of cells coupled in series, including a first cell 106, a second cell 108, and an nth cell 110. Each cell of the battery 102 is coupled to a secondary winding of the transformer 104. As such, the transformer includes a first secondary winding 112, a second secondary winding 114, and an nth secondary winding 116. The transformer also includes a single primary winding 118 coupled between a positive terminal 120 of the battery and a negative terminal 122 of the battery.

For each battery cell, a secondary switch and rectifier circuit are coupled between the cell and respective the secondary winding. For example, a first switch (SW1) 124 is connected between the first cell (Cell 1) 106 and a first rectifier circuitry 126, which is also connected to the first winding 112. Similarly, a second switch (SW2) 128 is connected between the second cell (Cell 2) 108 and a second rectifier circuitry 130, which is also connected to the second winding 114. An nth switch (SWn) 132 is connected between the nth cell 110 and an nth rectifier circuitry 134, which is also connected to the nth winding 116. A primary switch (SWP) 136 is coupled between the negative terminal 122 of the battery 102 and the primary winding 118. The secondary switches (124, 128, and 132) and primary switch 136 are coupled to control circuitry 138. The control circuitry 138 is also coupled to each cell (106, 108, 110).

In operation, the control circuitry monitors the voltage at each cell to detect any imbalance conditions. If an imbalance is detected in a cell, the control circuitry can modulate, or quickly actuate, the primary switch to energize the primary winding with the cumulative voltage of all of the cells in series. At the same time, the control circuitry can close a secondary switch to create a path for the energy stored in the primary winding through the respective secondary winding and the rectifier circuitry to the cell with the detected imbalance condition (e.g., under-voltage). In some embodiments, the control circuitry can close more than one secondary switch to allow multiple cells to be charged simultaneously.

Thus, during operation, energy can be taken from the battery pack (e.g., stack) as a whole and selectively applied to the cells with lower voltage. With this control scheme, the energy is generally displaced from the cells with higher voltage (energy) to the cells with lower voltage, thus achieving a desired cell balancing.

The efficiency of the transformer is dependent on the switching frequency and duty cycle applied to the primary switch. In a number of embodiments, the frequency and duty cycles are controlled to maximize efficient energy transfer from the battery as a whole to specific cells. In one embodiment, the switching control signal has a frequency of about 30 kilohertz (kHz). In such case, the efficiency can be about 60 percent.

During the energy transfer process, not only is the energy generally transferred to a cell with lower voltage, but some of the excess energy can be dissipated in form of heat in the transformer. In some embodiments, by altering the frequency and the duty cycle, the transformer can be used in an inefficient mode where some of the energy is dissipated in form of heat in the transformer. In such case, this control scheme can be used to deal with over-voltage conditions of multiple cells.

In some embodiments, the transformer has a 5 to 1 (primary to secondary) ratio. In other embodiments, other winding ratios can be used. In one embodiment, the primary winding is connected to a 28 volt source, and produces approximately 5.5 volts output at the secondary windings. In such case, voltage outputs can charge the cells to a preselected threshold voltage level at the secondary windings. In a number of embodiments the primary switch and the secondary switches are field effect transistors (FETs) configured to operate as switching FETs.

In some embodiments, the battery balancing circuit is configured as flyback type circuit. In such case, the energy transfer of the balancing circuit can be determined by the duty cycle of a control signal applied to the primary switch. In the flyback configuration, the rectifier circuitry can include a single diode configured as a rectifier. In other embodiments, the rectifier circuitry can include more than one diode. In a number of embodiments, the flyback configuration includes filtering circuitry to filter switching noise generated in this topology.

Figure 2:
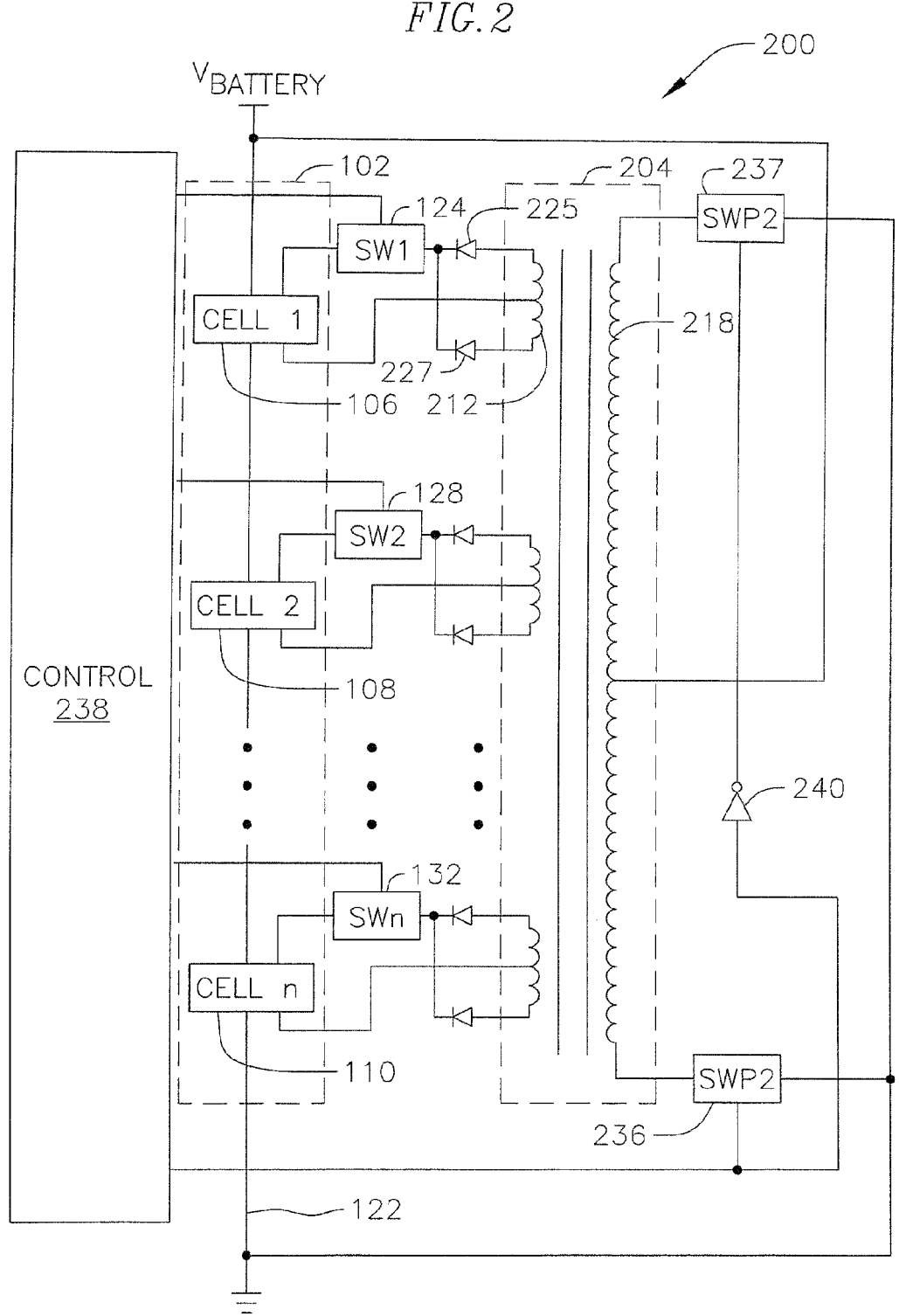
FIG. 2 is a schematic block diagram of a battery balancing circuit in accordance with another embodiment of the invention.

FIG. 2 is a schematic block diagram of a battery balancing circuit 200 in accordance with one embodiment of the invention. In a number of respects, battery balancing circuit 200 is identical to the battery balancing circuit 100 of FIG. 1. Battery balancing circuit includes a battery 102 having a number of cells (e.g., 106, 108, 110), where each cell is coupled by a switch (e.g., 124, 128, 132) to rectifier circuitry coupled to a secondary winding (e.g., 212) of a transformer 204. However, as compared to battery balancing circuit 100 of FIG. 1, battery balancing circuit 200 includes a primary winding 218 having a center tap in a forward converter configuration. The center-tap design can enable full-wave rectification for efficient transfer of energy. Primary switches (236, 237) are coupled between each end of the primary winding 218 and the negative terminal 122 of the battery (e.g., ground). The primary switches (236, 237) are coupled to control circuitry 238. More specifically, a control line is coupled to the control circuitry 238 and the second primary switch 236. The control line is also coupled to an inverter 240 coupled to the first primary switch 237. In such case, the push-pull configuration of the primary switches (236, 237) provides that, at any given time, one primary switch is on while the other primary switch is off.

For each battery cell, the rectifier circuitry coupled thereto can include a center tapped full wave rectifier including two diodes (e.g., diodes 225, 227) coupled to each end of a secondary winding (e.g., 212). For the first cell, for example, the cathodes of the diodes (225, 227) are coupled together at a node coupled to the first switch 124. The center tap leg of the first secondary winding 212 is coupled to a negative terminal of the first cell 106. The battery balancing circuitry 200 includes similar rectifier circuitry for the other cells. The center tapped full wave rectifiers can provide for efficient energy transfer to each cell while requiring only two diodes. In addition, the forward converter configuration with a center tapped full wave rectifier can be less noisy than flyback type designs and thus may not require filtering circuitry common to flyback type designs.

In a number of embodiments, the battery balancing circuit 200 operates in a similar fashion to the battery balancing circuit 100 of FIG. 1.

FIG. 3 is a flowchart of a process 300 for controlling a battery balancing circuit in accordance with one embodiment of the invention. In particular embodiments, process 300 can be used in conjunction with the control circuitry (138, 238) of FIG. 1 and/or FIG. 2. The process can first detect (302) or identify unbalanced cells. In a number of embodiments, the control circuitry can include circuitry configured to measure voltage or charge at each cell. Unbalanced conditions of cells that can be detected include over-voltage, under-voltage, and other unbalanced conditions. If no unbalanced cell is detected, the process can continue to monitor (302) the cells. If an unbalanced cell is detected, the process can then activate (304) the balancing transformer.

The process can then select (306) a charging mode. In one embodiment, the charging mode can provide for efficient energy transfer in one mode and inefficient energy transfer including non-minimal power dissipation in another mode. In the inefficient charging mode, a substantial amount of energy can be dissipated within the transformer. In such case, the transformer can be designed or selected based on an ability to safely dissipate substantial energy. The process can continue by operating (308) the primary and secondary switches of the transformer to transfer energy in the selected mode.

In one embodiment, the energy is efficiently transferred from highly charged cells to lower charged cells. In order to facilitate energy transfer, a switching control signal having a preselected frequency and duty cycle can be provided to the primary switch. In addition, the one or more secondary switches coupled to the particular battery cells identified as being unbalanced can be switched to enable charging thereof. The process can then determine (310) whether a sufficient balance has been achieved between the cells of the battery. If not, the process can return to operating (308) the primary and secondary switches of the transformer. If sufficient balance has been reached, the process can return to detecting (302) unbalanced cells.

In one embodiment, the process can perform the actions in any order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A method for balancing energy stored in a plurality of cells of a battery having a first terminal and a second terminal, the method comprising:
    identifying a subset of the plurality of cells having a voltage below a preselected threshold;
    identifying remaining ones of the plurality of cells having a voltage equal to or greater than the preselected threshold
    repeatedly open and close a primary switch coupled between the first terminal of the battery and a transformer comprising a primary winding and a plurality of secondary windings, wherein each secondary winding is coupled to one of the plurality of cells via a secondary switch of a plurality of secondary switches and a rectifier circuit, wherein the primary winding is coupled between the first terminal and the second terminal of the battery, and wherein the rectifier circuit rectifies a signal received from a corresponding one of the secondary windings; and
    closing a subset of the plurality of secondary switches coupled to the identified subset of the plurality of cells and opening remaining ones of the plurality of secondary switches coupled to the identified remaining ones of the plurality of cells while the primary switch is being repeatedly opened and closed.

2. A battery balancing circuit comprising:
    a battery comprising a plurality of cells coupled in series, a first terminal and a second terminal;
    a transformer comprising a primary winding and a plurality of secondary windings, wherein each secondary winding is coupled to one of the plurality of cells via a secondary switch of a plurality of secondary switches and a rectifier circuit, wherein the primary winding is coupled between the first terminal and the second terminal of the battery, and wherein the rectifier circuit is configured to rectify a signal received from a corresponding one of the secondary windings;
    a primary switch in series with the primary winding of the transformer; and
    a control circuitry coupled to the primary switch, the plurality of secondary switches, and each of the plurality of cells, and configured to control an open/close state of each of the primary switch and the plurality of secondary switches,
    wherein the control circuitry is further configured to:
        identify a subset of the plurality of cells having a voltage below a preselected threshold;
        identify remaining ones of the plurality of cells having a voltage equal to or greater than the preselected threshold;
        close a subset of the plurality of secondary switches coupled to the identified subset of the plurality of cells and open remaining ones of the plurality of secondary switches coupled to the identified remaining ones of the plurality of cells; and
        repeatedly open and close the primary switch while the identified subset of the plurality of cells are closed and the remaining ones of the plurality of secondary switches are opened.

3. The circuit of claim 2, wherein the control circuitry is configured to:
    detect an imbalance condition in at least one cell of the plurality of cells.

4. The circuit of claim 3, wherein the control circuitry is configured to:
    measure a voltage at each of the plurality of cells; and
    actuate, repeatedly, the primary switch such that energy is transferred from the battery to the subset of the plurality of cells.

5. The circuit of claim 3, wherein the imbalance condition is selected from the group consisting of an under-voltage and an over-voltage.

6. The circuit of claim 2, wherein the control circuitry is configured to actuate the primary switch at a preselected frequency and with a preselected duty cycle.

7. The circuit of claim 2, wherein the control circuitry is configured to:
    energize the primary winding by switching the primary switch; and
    provide a path for energy from the primary winding to the subset of the plurality of cells by switching the subset of the plurality of secondary switches.

8. The circuit of claim 2, wherein each of the rectifier circuits comprise a full wave rectifier.

9. The circuit of claim 8, wherein the full wave rectifier comprises a center tapped full wave rectifier including at least two diodes.

10. The circuit of claim 2, wherein each secondary winding is connected to a corresponding rectifier circuit and a corresponding secondary switch is connected between the corresponding rectifier circuit and a corresponding cell of the battery.

11. The circuit of claim 2, wherein each of the rectifier circuits consist of a diode.

\* \* \* \* \*